United States Patent [19]

Kontz

[11] 4,206,168
[45] Jun. 3, 1980

[54] METHOD FOR MOLDING PLASTIC ARTICLES

[75] Inventor: Robert F. Kontz, Toledo, Ohio

[73] Assignee: Owens-Illinois, Inc., Toledo, Ohio

[21] Appl. No.: 924,481

[22] Filed: Jul. 13, 1978

Related U.S. Application Data

[62] Division of Ser. No. 826,506, Aug. 22, 1977, Pat. No. 4,133,627.

[51] Int. Cl.² .............................................. B29D 23/02
[52] U.S. Cl. .................................... 264/294; 264/538; 264/328
[58] Field of Search ............... 264/537, 538, 294, 328, 264/329; 425/555, 575–577, 533, 534

[56] References Cited

U.S. PATENT DOCUMENTS

| | | | |
|---|---|---|---|
| 3,172,929 | 3/1965 | Santelli | 264/537 |
| 3,941,539 | 3/1976 | Saumsiegle et al. | 425/533 X |
| 4,147,748 | 4/1979 | Saumsiegle | 264/537 X |

Primary Examiner—Jan H. Silbaugh
Attorney, Agent, or Firm—Richard D. Heberling

[57] ABSTRACT

A method and apparatus are disclosed for molding plastic articles, wherein the method includes the steps of filling a mold cavity at a first station with heated flowable plastic material under relatively low pressure from a first pressure source and then displacing the mold to a second station where the plastic material is cooled under pressure from a second pressure source. During the displacing step, the mold is conveyed along an arcuate path and the mold orientation is maintained. The apparatus includes a cantilevered core pin concentrically positioned in the mold cavity and a set of radially biased neck rings which preferably open automatically under a constant biasing force to release the neck of a molded article after the core pin is withdrawn from the article.

3 Claims, 10 Drawing Figures

METHOD FOR MOLDING PLASTIC ARTICLES

This is a division of application Ser. No. 826,506, filed Aug. 22, 1977, now U.S. Pat. No. 4,133,627, issued Jan. 9, 1979.

BACKGROUND OF THE INVENTION

1. Field of the Invention

This invention relates generally to a method and apparatus for molding thermoplastic articles, and more particularly to a method and apparatus for filling a mold cavity at one station and then transferring the mold to a second station where pressure is applied to the thermoplastic material for curing. In a separate aspect, the invention relates to a neck ring mold assembly which includes a pair of outwardly biased neck ring sections.

2. The Prior Art

Various molding assemblies and methods have been disclosed and utilized in the prior art to form thermoplastic articles by injection molding. Typically, the methods include injecting thermoplastic material at relatively high pressure through a rather small sprue opening into a mold cavity and then thermally conditioning the material in the mold at a fixed position adjacent the injection assembly. Certain patents, such as U.S. Pat. No. 3,270,383 have disclosed the use of relatively large sprue openings in the injection process; while a larger group of patents have generally disclosed the concept of transferring thermoplastic material from an accumulator at relatively low injection pessures. Representative of this last group of patents are U.S. Pat. Nos. 3,231,656, 3,453,353, 3,280,236, 3,433,862, 3,947,203, 3,375,553, 3,196,198, and 3,092,440. In a related area, patents such as U.S. Pat. Nos. 3,670,066 and 3,270,383 have disclosed the concept of applying pressure to thermoplastic material within a mold cavity, but only for the limited purpose of accounting for shrinkage.

This state of the art has resulted in several previously unsolved problems, as follows:

"Flashing" of the plastic material generally occurs between the mold and the accumulator, even in those methods involving low injection pressures because a high packing pressure is applied to the material in the mold before the material cools from a heated flowable condition.

Heat is transferred between the cooled mold and the adjacent heated accumulator, resulting in (a) cold slugs in the accumulator and (b) increased cycle time to properly cool the material in the mold.

Plastic material has been subject to degradation due to high injection pressures, high packing pressures, and prolonged cycle times.

Large hydraulic clamping equipment has been required previously to maintain the molds closed during both the injection cycle and the cooling cycle. As is common knowledge, such equipment is not only expensive to purchase and operate, but also requires frequent maintenance.

Further, although the prior art has suggested apparatus and methods to form a molded neck finish on an article, it has failed to suggest the economical neck ring assembly of the present invention.

SUMMARY OF THE INVENTION

The present invention overcomes those prior art problems and disadvantages in a method and apparatus, wherein a mold cavity is filled at one station with plastic material at low pressure and is then transferred to a second station to cool the material under pressure.

More specifically, the method includes filling an internal mold cavity by flowing heated, flowable thermoplastic material through a sprue opening in the mold. While the thermoplastic material is still in a heated flowable condition within the internal mold cavity, the mold is displaced along an arcuate path in a plane including the axis of the sprue opening to a second station where the sprue opening is in alignment with an axially reciprocal pressurizing rod. Then, the pressurizing rod is inserted into the sprue opening to apply pressure to the thermoplastic material while the material is cooled to an essentially self-supporting condition.

In the more specific disclosure, the mold includes an elongated cantilevered core pin in axial alignment with the sprue opening. Neck ring sections are provided to form a finish on the molded article, the neck ring sections being part of a neck ring assembly which is freely slidable on the core pin. The neck ring sections include a cam follower surface in engagement with a cam surface on a tubular neck ring carrier of the overall assembly, so that the neck ring sections are radially displaced along an axis which forms an acute angle relative to the core pin when the molded article is ejected.

Also in the more specific disclosure, a mold structure extends away from the mold in the direction of the cantilevered end of the core pin. This structure includes a pair of diametrically opposed notches remote from the female mold, which accommodate the radially outward displacement of the neck ring sections when they are axially displaced by the core pin to an ejecting position.

In short, the method of this invention as it relates to the ejection of a tubular molded article includes, first, axially displacing the core pin, neck ring sections and molded article together from the mold cavity. Then, the neck ring sections are maintained in a closed position on the parison finish while the core pin is telescopically withdrawn from the article. After the core pin is essentially withdrawn, then the neck ring sections are radially displaced.

Accordingly, the present invention embodies a significant advance over the prior art for at least the following reasons:

(1) A significant reduction in flash can be achieved because the plastic material may be injected into the mold cavity at a relatively low pressure and because the pressure imposed upon the plastic material by the rod at the second station may initially be nominal;

(2) Improved cycle times may be achieved due to the elimination of heat transfer between the accumulator and mold during curing and due to the efficient use of the plasticizer and accumulator;

(3) The pressure imposed on the material during cooling may be carefully regulated by the physically separated curing station in order to minimize material degradation in materials such as polyethylene terephthalate, which is susceptible to crystallization and to the generation of acid aldehyde;

(4) The cost of the molding equipment may be reduced because large clamping equipment may be eliminated and because the mold can be made much lighter;

(5) Shear stresses may be minimized during the injection cycle due to the use of an enlarged sprue opening;

(6) The disclosure provides for the formation of a threaded finish on the article in the injection molding process; and (7) The specific disclosed embodiment provides a low-cost machine which is especially useful for making test parisons.

BRIEF DESCRIPTION OF THE DRAWINGS

FIG. 3 illustrates the mold assembly in alignment with the delivery port of an accumulator. FIG. 4 illustrates the mold assembly in alignment with a pressurizing rod which applies pressure to the plastic material during cooling.

FIG. 8 illustrates the core pin partially withdrawn. FIG. 9 illustrates the core pin totally withdrawn from the mold and with the neck rings opened. FIG. 10 illustrates the core pin advancing back into the mold cavity.

DETAILED DESCRIPTION OF THE PREFERRED EMBODIMENT

General Arrangement

Figure 1:
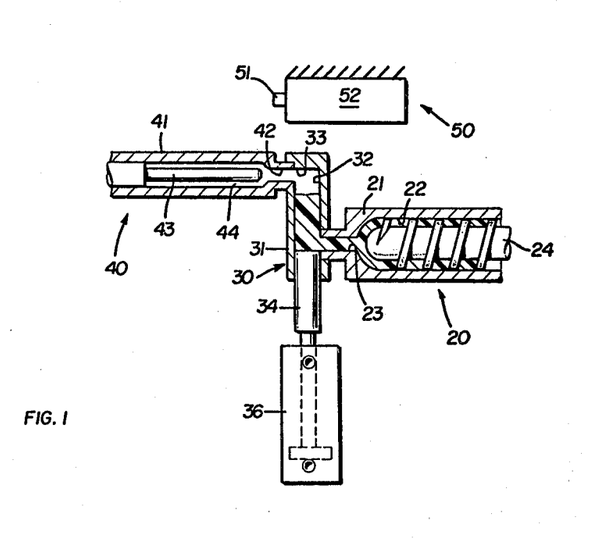
FIGS. 1 and 2 schematically illustrate the general method of the present invention, whereby a mold cavity is filled with thermoplastic material under relatively low pressure at a first station and the mold is then displaced to a second station where the thermoplastic material is cooled under pressure.
Figure 2:
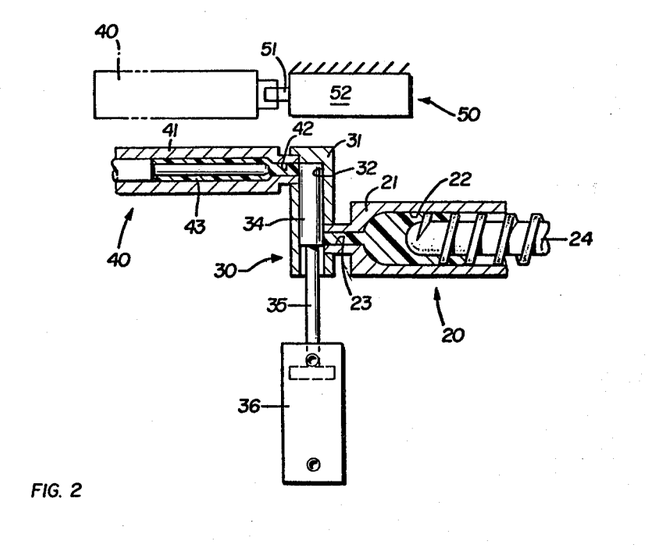

FIGS. 1 and 2 illustrate the general arrangement of this invention, which includes a plasticizer 20, an accumulator 30, a moveable mold 40 and a pressurizing assembly 50.

The plasticizer 20 includes a fixed barrel 21, which is secured to the accumulator 30, and an internal plasticizing chamber 22 and delivery port 23. An axially reciprocal, rotary screw 24 in chamber 22 receives thermoplastic pellets which are converted into a heated flowable resin for delivery to the accumulator. The plasticizer barrel 21 includes heating means (not shown) in the conventional manner.

The accumulator 30 includes an elongated, essentially tubular housing 31 which is secured to the plasticizer 20 adjacent one end and which receives the mold 40 adjacent its other end. The accumulator housing 31 therefore includes an internal accumulator chamber 32 and an exit delivery port 33. An elongated cylindrical ram 34 is closely received in the chamber 32 and is axially reciprocated by a piston rod 35 of a hydraulic ram assembly 30. As shown in FIG. 1, the ram 34 is retracted to a position to accommodate flow of plastic from the plasticizer 20 into the accumulator 30. FIG. 2 shows the ram 34 in an advanced position, blocking off delivery port 23 and having forced plastic material from the accumulator into the mold 40.

The mold assembly 40 includes a female mold member 41 and an axial sprue opening 42 in alignment with delivery port 33 of the accumulator. An elongated cantilevered core pin 43 fits within the female mold 41 to define an essentially tubular mold cavity 44.

As shown in FIG. 2, the mold 40 may be displaced from its position in alignment with the delivery port 33 of the accumulator to a second position shown in phantom in alignment with the pressurizing member 50. This pressurizing member includes an axially moveable pressurizing rod 51 of a hydraulic ram 52. The pressurizing rod 51 has a size and configuration conforming closely to that of the sprue opening 42 for applying pressure to the thermoplastic material during cooling. Most preferably, both the pressuring rod and sprue opening have a diameter of about one-quarter to one-half inch, this being a somewhat large sprue opening to reduce shear stresses in the plastic material.

In operation, a molding cycle is initiated by retracting ram 34 from within accumulator 30 to the position shown in FIG. 1. As a result, heated, flowable plastic material is delivered into the accumulator chamber 30 from the plasticizer 20. As shown in FIG. 1, this cycle has progressed to the point where the accumulator chamber 32 is substantially filled with plastic material. At about the time in the cycle represented by FIG. 1, or very shortly thereafter, hydraulic chamber 36 is actuated to advance piston 35 and ram 34 into the accumulator chamber 32 to the position shown in FIG. 2 for the purpose of injecting plastic material into the mold cavity by way of sprue opening 42. As will be appreciated, optional valving (not shown) may be provided in the accumulator 30 in region of flow passageway 33 to regulate the flow of plastic material from chamber 32 to the mold assembly.

In accordance with the present invention, the plastic material is injected into the accumulator chamber 32 from the plasticizer 20 and then into the mold cavity at relatively low injection pressures. As a result, the injection molding temperatures may be maintained at a lower level than in prior methods, providing the advantages previously enumerated. It will be understod, of course, that pressures on the order of up to 5,000 psi may be developed at the point in the cycle represented by FIG. 2 simply as a result of the size of the plastic shot being slightly greater than the mold cavity side. Even if this occurs, it is considered to be an incidential effect of the injection cycle and does not appear to diminish the overall advantages of the invention.

After the point in the cycle represented by FIG. 2, the mold 40 is displaced to the phantom line position in alignment with the pressurizing assembly 50. At about the same time, ram 34 is retracted by piston 35 back to the position shown in FIG. 1, thereby accommodating the flow of further plastic material from the plasticizer 20.

As is conventional in the art, cooling fluid is continuously circulated through internal cooling ducts (not shown) of the mold assembly. Thus, the cooling cycle starts as soon as plastic material is forced from the accumulator into the mold assembly. However, the plastic material is still in a heated, uncured condition as the mold 40 is displaced from adjacent the accumulator to the phantom line position in alignment with the pressurizing rod 51. Once the mold is properly positioned, the rod 51 is advanced to apply pressure to the plastic material within the mold cavity during the solidification cooling process. In accordance with the invention, the pressure applied by the rod 51 may be regulated as desired. For example, either a constant low or high pressure may be applied to the material to compensate for shrinkage. Alternatively, the pressure applied by rod 51 may be varied as desired for several different purposes. For example, an initial low pressure may be applied to minimize flashing, with a higher pressure being applied after the material has cooled from a flowable condition. As another example, the pressure may be varied to control properties in thermoplastic materials, such as crystallization in polyethylene terephthalate.

After the plastic material within the mold cavity has cooled to a self sustaining condition, the core pin 43 may be retracted from the female mold 41. Then, the thermoplastic material may be stripped from the core pin in a conventional manner and then blown into a container in a blow molding operation. Next, the core pin 43 is repositioned in the mold assembly, which is then transferred back to a position in engagement with the accumulator chamber 31 to receive a subsequent shot of plastic material.

The Preferred Mode

Figure 3:
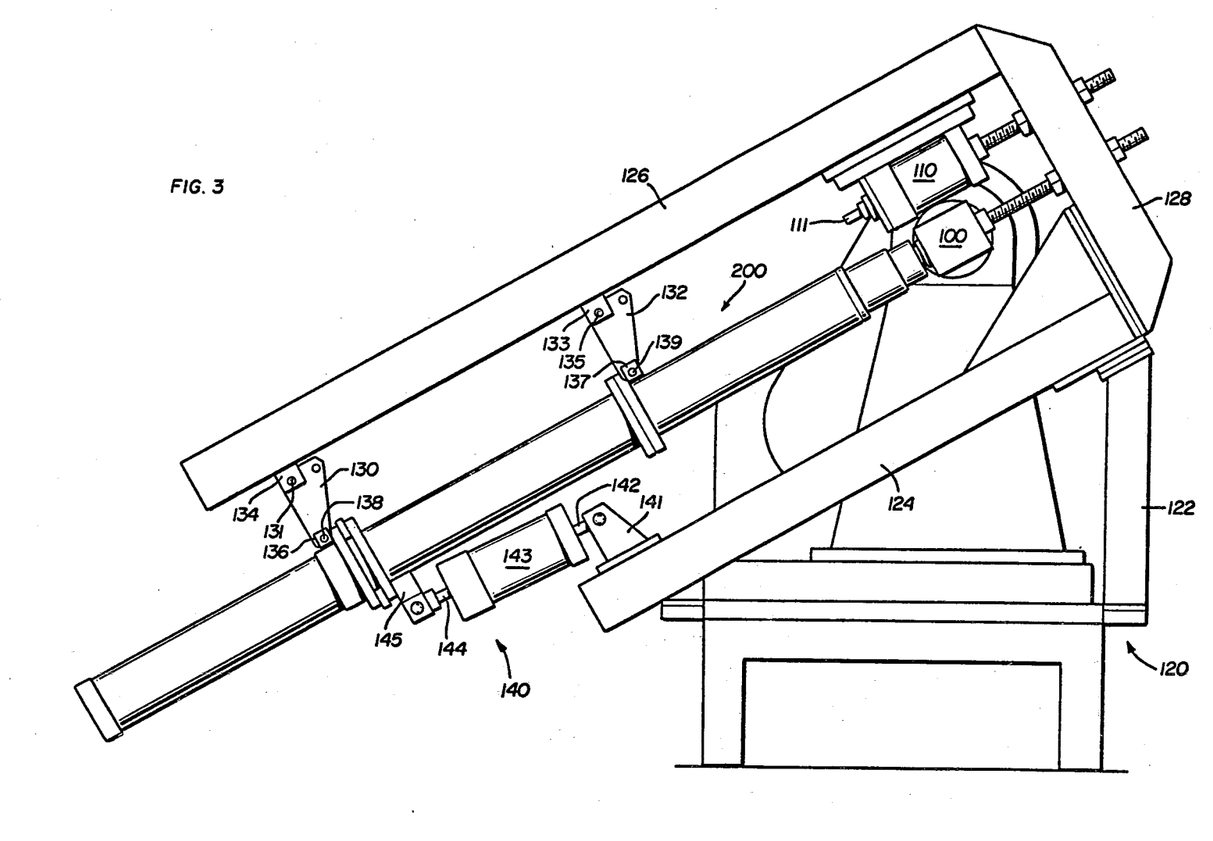
FIGS. 3 and 4 are side elevational views of the most preferred arrangement of the disclosure.
Figure 4:
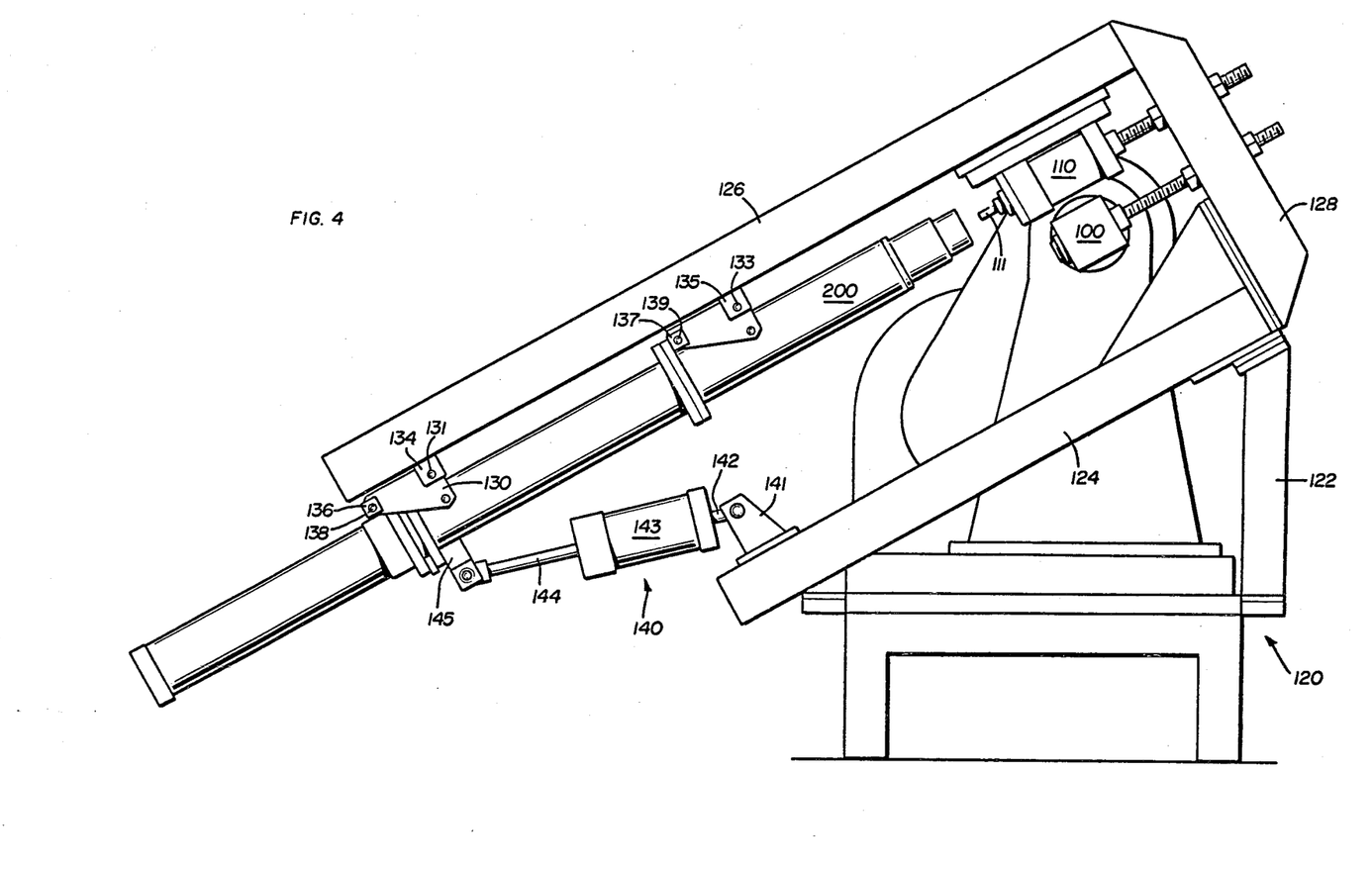

In the more specific disclosure, the molding assembly, accumulator, and pressurizing assembly are supported on a rigid support structure shown in FIGS. 3 and 4. In these Figures, the accumulator is represented by reference numeral 100, the pressurizing assembly by reference numeral 110, and the mold assembly by reference numeral 200. As shown, the mold assembly is oriented at an incline relative to the horizontal, with the accumulator and pressurizing assembly being appropriately oriented accordingly.

The support structure includes a support table 120 to which a vertical support arm 122 is rigidly connected. A generally U-shaped support structure is mounted both to the table 120 and to the vertical arm 122 and includes a lower support leg 124, an upper support leg 126 and a bridging support member 128.

The mold assembly 200 is suspended from the upper support leg 126 by a pair of pivotal hangers 130 and 132, permitting the mold assembly to be displaced from a position adjacent the accumulator to a position in alignment with a pressurizing rod 111, as shown in FIG. 4. Each hanger is pivotally supported by a respective pin 131, 133 in brackets 134, 135 which are rigidly mounted on the upper support leg 136. Similar brackets 136 and 137 are rigidly connected to the mold assembly 200 and include respective pins 138 and 139 which pivotally receive the opposite ends of respective hangers 130 and 132.

The means for displacing the mold assembly 200 includes a hydraulic piston and cylinder arrangement 140 which is interconnected between the lower support leg 124 and the mold assembly 200. More specifically, a bracket 141 is rigidly connected to the lower support leg 124 and pivotally receives a coupling member 142 of the hydraulic assembly. A hydraulic (or pneumatic) cylinder 143 is rigidly connected to the coupling member 142. An axially reciprocal piston rod 144 extends from the cylinder 143 and is pivotally connected to a bracket 145 rigidly mounted on the mold assembly 200.

In overall operation, the mold assembly 200 is positioned as illustrated in FIG. 3 to receive plastic material from the accumulator 100, which is rigidly connected to the supporting structure and which receives plastic material from a plasticizer (not shown).

After the mold cavity is filled, the ram assembly 140 is actuated to extend piston rod 144 and thereby displace the mold assembly 200 to the position shown in FIG. 4. During this displacement, the axis of the mold assembly, including the axes of the sprue opening and core pin, are maintained parallel to their position at the filling station. Additionally, the mold is displaced along an arcuate path which is included in a plane that also includes the axis of the pressurizing rod 111 and the axis of the mold assembly at the accumulator position.

After the mold assembly 200 is displaced to the position of FIG. 4, the pressurizing rod 111 is extended for insertion into a sprue opening for applying pressure to the thermoplastic material during solidification cooling. At this position, the hangers 130 and 132 are axially aligned along an axis parallel to the pressurizing rod 111, such that the hangers are placed in axial tension during the application of force on the plastic material within the mold.

After the plastic material has cooled to a self-sustaining position, it is ejected from the mold, the pressurizing rod 111 is retracted, and the piston rod 124 is retracted to return the mold assembly 200 back into position at the accumulator 100.

Figures 5, 6, 7:
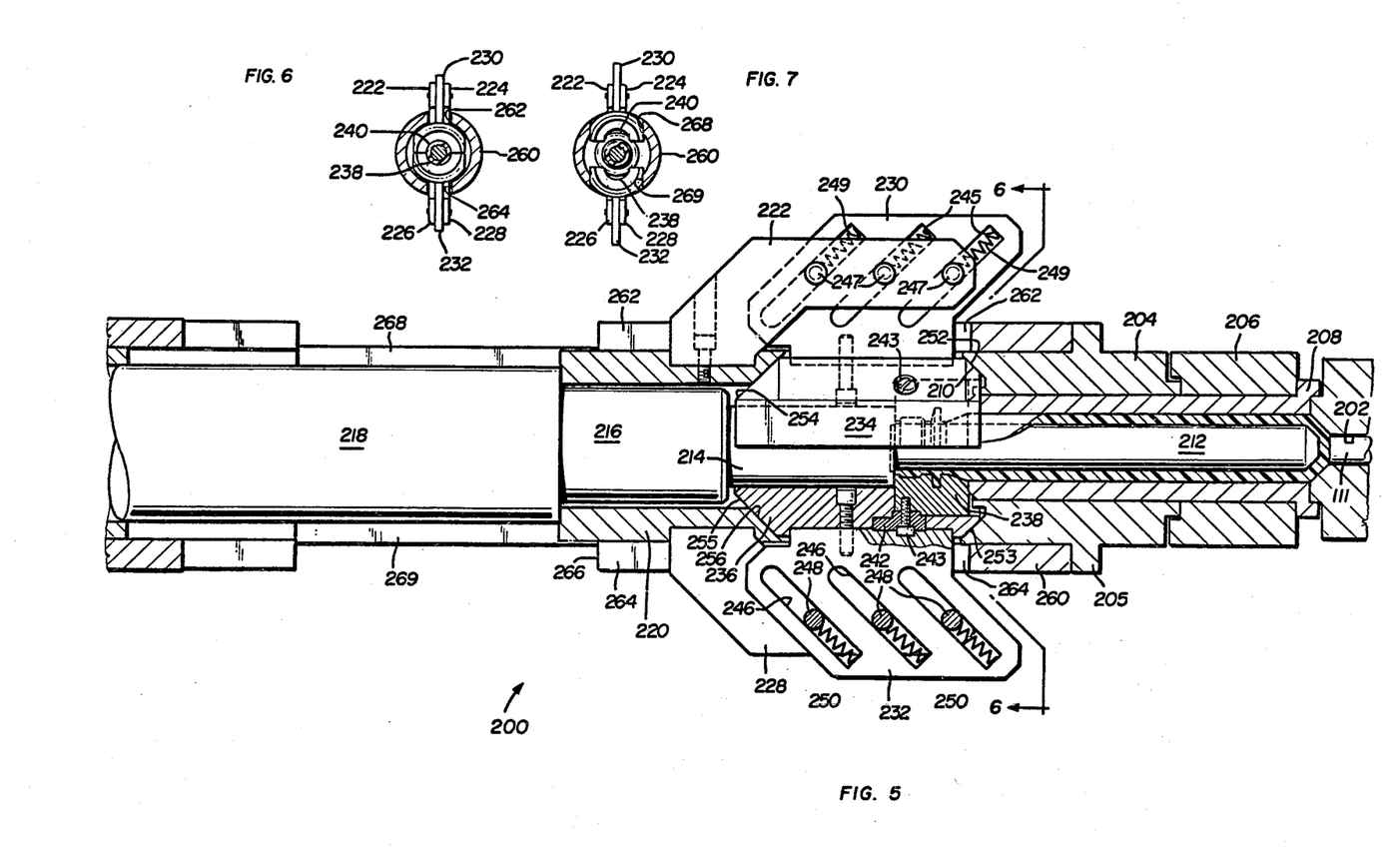
FIG. 5 is an enlarged, fragmented view of the mold cavity, core pin, and neck ring assembly.
FIG. 6 is a sectional view along plane 6—6, as illustrated in FIG. 5.
FIG. 7 is a sectional view similar to FIG. 6, but illustrating the neck rings in their opened position.

Turning now more particularly to FIGS. 5–10, the molding assembly 200 is illustrated in alignment with the pressurizing rod 111 which is inserted into the mold sprue opening 202 to apply pressure to the thermoplastic material during solidification cooling. The mold 200 includes a pair of axially aligned, fixed outer tubular cavity blocks 204 and 206 within which an interior tubular mold cavity plate 208 is positioned. Although not shown, suitable cooling ducts may be provided in either the outer cavity blocks or the tubular mold cavity in a conventional manner. As best shown in FIG. 5, the cavity block 204 includes a beveled locking surface 210, having a purpose which will be more fully explained in the later portions of this disclosure.

An elongated, cylindrical, cantilevered core pin 212 is positioned within the interior tubular mold cavity plate 208 to define an essentially tubular mold cavity. The core pin 212 is mounted on an enlarged cylindrical portion 214 which is mounted to an axially moveable ram 216 that is displaced by a rod 218 of a hydraulic ram (not shown).

A freely moveable neck ring assembly includes a tubular neck ring support collar 220 to which two pairs of diametrically opposed guides 222–224 and 226–228 are rigidly mounted (see FIGS. 6 and 7). A radially moveable neck ring sub-assembly includes a pair of diametrically opposed followers 230 and 232 which are rigidly connected respectively to a pair of neck ring carriers 234 and 236. A pair of neck ring mold members 238 and 240 (see FIGS. 6 and 7) are connected to each respective carrier by a respective semi-annular collar, or key, 242 and screws 243.

Each follower 230 and 232 includes three inclined slots 245 and 246, receiving corresponding pins 247 and 248 that are rigidly secured to the respective sets of guides 222–224 and 226–228. Respective sets of compression springs 249 and 250 are respectively received in the slots 245 and 246 to seat against the pins and against end abutment surfaces in the slots to bias each respective set of followers, neck ring carriers, annular connectors and neck ring molds outwardly.

Each neck ring carrier 234 and 236 includes a respective beveled surface 252 and 253 which seat against the beveled surface 210 of cavity block 204. This arrangement locks the radially moveable neck ring sub-assemblies in place in the molding position as shown in FIG. 5. Each neck ring carrier also includes a respective inclined cam follower surface 254 and 255 which mate with a complementary inclined surface 256 on the neck ring support collar 220. This arrangement assists in guiding the neck rings sub-assemblies during their inclined, radial movement.

As shown in FIGS. 5, 6 and 7, the mold assembly also includes an essentially tubular support structure 260 to accommodate the opening and closing of the neck ring sub-assemblies. As shown in FIG. 5, this structure extends rearwardly, i.e. to the left as shown, from an annular flange 205 on the cavity block 204. The support structure includes a first pair of elongated diametrically opposed notches 262 and 264 which extend from approximately the aft end of the cavity block 204 to a position designated by reference numeral 266. Beginning at that point is a second pair of wider, elongated diametrically opposed notches 268 and 269. As shown in FIG. 6, notch 262 corresponds in width, and is slightly wider than, the combined widths of guides 222 and 224 and the width of follower 230. The width of notch 264 is likewise slightly larger than the combined widths of elements 226, 228 and 232. This arrangement allows these elements to extend out of less notches yet the widths of notches 262 and 264 are less than the widths of neck ring members 234 and 236, thereby maintaining the radially moveable neck ring sub-assemblies in a closed position.

As shown in FIG. 7, the widths of notches 268 and 269 correspond essentially to the width of neck ring members 234 and 236. Accordingly, when the neck ring assembly is displaced to a position in radial alignment with notches 268 and 269, the biasing force on followers 230 and 232 permits the neck ring sub-assemblies to move radially outwardly for the ejection of a molded part.

Figure 8:
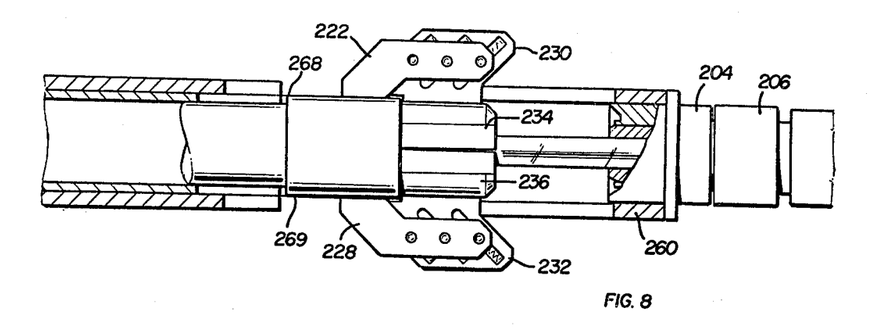
FIGS. 8-10 are side elevational views in partial section, illustrating the operation of the neck rings during core pin retraction and advancement. More specifically.
Figure 9:
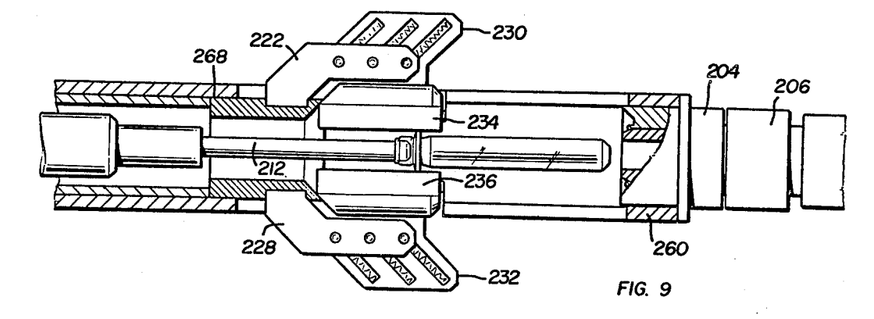
Figure 10:
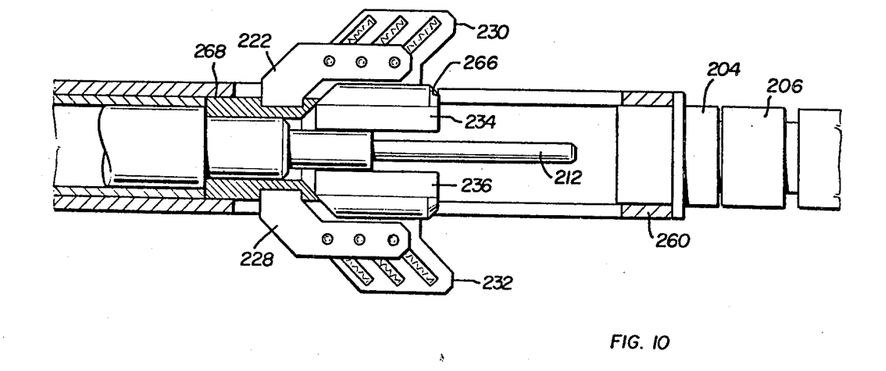

The ejection procedure is illustrated more particularly in FIGS. 8-10. After the molded part has cooled to a self-sustaining condition, the rod 218 is retracted. This causes core pin 212 to be withdrawn from within the tubular mold cavity plate 208. Withdrawal of the core pin pulls the molded article out of the internal mold cavity and also causes the entire neck ring assembly to be displaced with the core pin, as shown in FIG. 8. As disclosed previously, the neck ring assembly is freely moveable independently of the core pin, but is withdrawn with the core pin because the neck rings are closed on the molded neck of the article.

The neck ring assembly is withdrawn beyond its position illustrated in FIG. 8 to the position of the tubular neck ring support collar 220 shown in FIG. 9. At that point, the neck ring assembly engages a stop, but the core pin continues to be axially displaced for its telescopic withdrawal from the molded article. As will be appreciated, the neck ring assembly at the position shown in FIG. 9 is in radial alignment with notches 268 and 269. Therefore, the neck ring carriers 234 and 236 would be displaced outwardly under the pressure of springs 245 and 246 if their outward movement were truly radial. The prior disclosure illustrates that the outward movement is not truly radial due to the inclined arrangement of slots 245 and 246 and due to the inclined cooperating surfaces 254, 255, and 256. By this arrangement, outward movement of the neck ring sub-assemblies is restrained until the core pin 212 is fully withdrawn from the molded article because the neck ring molds 238 and 240 are in engagement with the neck of the molded part and are prevented thereby from moving along the inclined outward path. In other words, friction between the molded article and the core pin resists movement of the article in the direction of the mold; since the article is restrained from axial movement, the neck ring sub-assembly is likewise restrained from its inclined, radial movement.

FIG. 9 illustrates the neck ring assemblies opened, whereupon the molded article may be removed.

After removal of the molded article, which in the preferred embodiment is shown as being a closed-end blowable parison, the core pin is advanced for re-insertion within the internal mold cavity. As shown in FIG. 10, piston 218 engages the tubular neck ring support collar 220 during the advancement of the core pin. Further advancement of the core pin causes neck ring carriers 234 and 236 to engage surface 266, at which time the neck ring support collar 220 advances axially relative to the radial movable neck ring sub-assemblies, as follows. The neck ring carriers 234 and 236 are prevented from moving axially but move toward each other in the radial direction because followers 230 and 232 are being forced inwardly by pins 247 and 248. Once the moveable neck ring sub-assemblies close on each other, then the sub-assemblies move with the neck ring support collar and cantilevered core pin back to the position shown in FIG. 5. Thereafter, the mold is displaced back to a position adjacent an accumulator to receive a subsequent shot of plastic material, in accordance with the foregoing disclosure.

It will be understood that the previous disclosure is exemplary in nature and that various modifications may be made without departing from the essence of the invention.

Having therefore completely and sufficiently disclosed my invention, I now claim:

1. A method of forming a polyethylene terephthalate article, comprising the steps of:
   filling an internal mold cavity and an elongated sprue opening in a mold at a first station with plasticized plastic polyethylene terephthalate material, the internal mold cavity having a longitudinal axis at an acute angle relative to the horizontal and communicating with the sprue opening.
   moving the mold from the first station along an arcuate path to a second station where the sprue opening is in alignment with an inclined axially reciprocal pressurizing rod, the two positions of the sprue opening axis at said first and second stations being parallel and the arcuate path being included within a plane which also includes said two positions of the sprue opening axis;
   axially displacing the rod into the sprue opening to apply pressure to the plastic material while the material is still in a plasticized state within the internal mold cavity;
   maintaining pressure on the plastic material within the internal mold cavity by said rod, while the plastic material is cooled to a self-sustaining state;
   removing the plastic material from the mold cavity as a molded article after having been cooled; and then
   moving the mold back to the first station to receive additional plastic material in a heated, flowable condition.

2. A method of forming an essentially tubular thermoplastic article, comprising the steps of:
   positioning a mold at a first station, the mold including (a) a female portion positioned at an acute angle relative to the horizontal and including an elongated cavity communicating with an essentially cylindrical sprue opening at its upper end and (b) an elongated core pin concentrically positioned within the cavity, cooperatively defining an essentially tubular, inclined mold cavity;

flowing heated thermoplastic material at relatively low pressure through the sprue opening and into the inclined tubular mold cavity until both the cavity and sprue are essentially filled with thermoplastic material;

displacing the mold from the first station in a vertical plane to a second station where the sprue opening is in axial alignment with an inclined, axially movable, essentially cylindrical pressurizing rod, and maintaining the core pin axis at the same acute angle relative to the horizontal during such displacement;

displacing the pressurizing rod into the sprue opening and applying pressure with the rod to the thermoplastic material while the material is cooled to a self-sustaining condition; and ejecting the thermoplastic material from the inclined mold cavity as a tubular article.

3. The method as defined in claim 2, characterized by displacing the mold along an arcuate path during movement between said first and second stations.

* * * * *

UNITED STATES PATENT AND TRADEMARK OFFICE
CERTIFICATE OF CORRECTION

PATENT NO. : 4,206,168
DATED : June 3, 1980
INVENTOR(S) : Robert F. Kontz

It is certified that error appears in the above-identified patent and that said Letters Patent are hereby corrected as shown below:

Col. 1, line 31, "pessures" should be --pressures--.

Col. 4, line 19, "chamber" should be --cylinder--.

Col. 7, line 20, "Lwss" should be --these--.

Signed and Sealed this

Sixth Day of January 1981

[SEAL]

Attest:

SIDNEY A. DIAMOND

Attesting Officer

Commissioner of Patents and Trademarks